Feb. 3, 1970 J. R. UBER 3,492,917
BROACHING APPARATUS
Filed Oct. 6, 1967

INVENTOR.
JAMES R. UBER
BY
Hauke, Kross, Gifford
ATTORNEYS

# United States Patent Office 3,492,917
Patented Feb. 3, 1970

3,492,917
BROACHING APPARATUS
James R. Uber, Pleasant Ridge, Mich., assignor to Colonial Broach & Machine Company, Warren, Mich., a corporation of Delaware
Filed Oct. 6, 1967, Ser. No. 673,408
Int. Cl. B23f 9/04, 9/06; B23d 41/04
U.S. Cl. 90—10                                            7 Claims

ABSTRACT OF THE DISCLOSURE

A broaching apparatus having a pot-broach assembly for cutting external helical splines or gears on a workpiece when the broach assembly is positively rotated and the workpiece is fixed relative thereto. A cam and follower arrangement is used such that the cam track is coextensive with the vertical movement of the broach pot.

BACKGROUND OF THE INVENTION

Field of the invention

The present invention relates to broaching apparatus, and more particularly, to broaching apparatus used for the production of parts having external helical gears or splines on their outside periphery such as gears or the like.

Description of the prior art

In the prior art, various methods of external helical broaching have been used. One method has been the practice to arrange the internal cutting teeth in the broach assembly to form a helix of the desired lead so that the work blank is rotated solely as a result of its engagement with the broach. That is, the broach in cutting the helical splines, such as teeth on a gear, will cause the gear to rotate about its axis.

Still another prior art method of external helical broaching is to have an internally toothed broach secured against rotation and have the work blank passed downward through a fixed broach while simultaneously rotating the work. An example of the type of operation is generally disclosed in the U.S. Patent No. 2,674,924 issued April 13, 1954.

SUMMARY

According to the present invention pot-type broaching is employed such that positive acting guide means are used to rotate the broaching assembly while the assembly is pushed down over the work blank that is secured against rotation. In accordance with the present disclosure the pot is actually the broach holder which contains the broaching tools having internally arranged teeth, fixably retained therein.

The holder is positively rotated by a cam mounted on the machine and cam follower mounted on the holder. Radial arm means secured to the broach pot are used to support the cam follower so that the broach pot is positively driven directly by the cam means whereby the cutting action is exactly controlled. Also the fact that the cam track is disposed substantially coextensive with the axial and revolving movement of the broach pot provide an apparatus which is compact in design, inexpensive to manufacture and wherein the overall height of the machine is not increased.

DESCRIPTION OF THE PREFERRED EMBODIMENT

Figure 1:
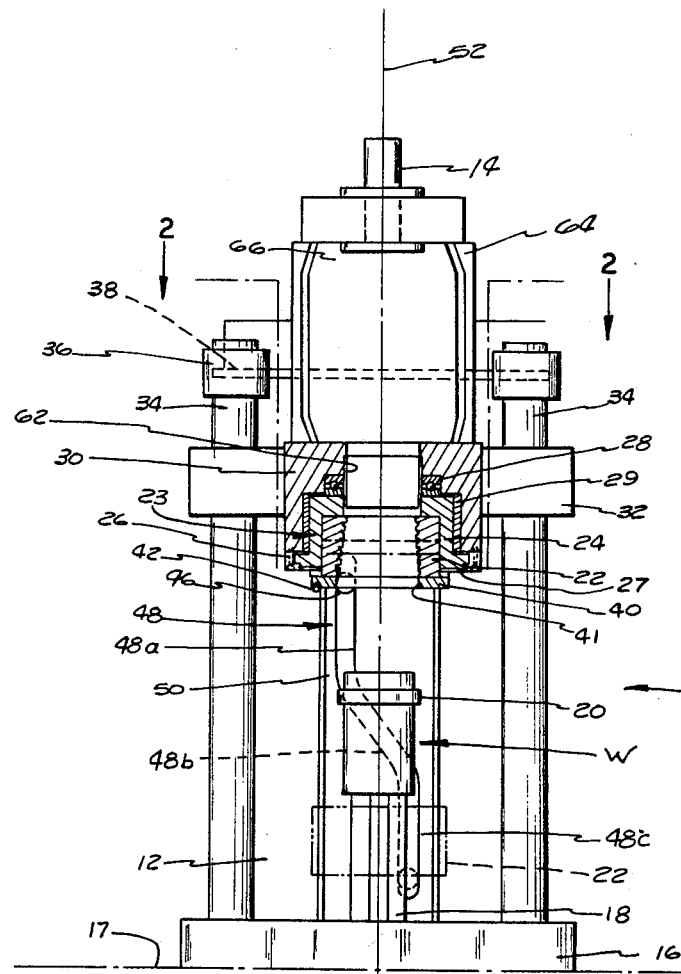
FIG. 1 is a front elevational view partially in section of the gear broaching apparatus constructed in accordance with the present invention.

Referring now to the drawings, a preferred form of the broaching apparatus 10 is illustrated in FIG. 1 mounted in connection with a conventional hydraulic ram machine having a vertical column 12 and a ram 14 movable vertically by a hydraulic piston and cylinder (not shown).

The broaching apparatus 10 has a base plate 16 mounted on the base or table of the hydraulic ram whose upper surface is indicated by the trace line 17. The plate 16 has a vertical work support post 18 of generally cylindrical shape suitably positioned thereon. The workpiece, generally indicated at W, is preferably fixably supported on the post 18 by suitable means such as a work support fixture (not shown), so as to be formed complementary to the internal surface contour of the broach W while being bolted or otherwise suitably secured on the upper end of post 18. The workpiece W is secured on the fixture by appropriate means such as a cooperating key and keyway arrangement to allow for ready removal while being positively retained against rotational movement.

The workpiece W of the disclosed embodiment has a circular collar ring 20 received in an annular recess and extending beyond the peripheral surface so that external helical teeth or splines can be formed thereon by means of the tubular internally toothed broaching tool, indicated at 22. In the instant embodiment the workpiece could be formed of aluminum while the ring 20 is of a harder material such as brass, for example. It is to be understood that this arrangement is illustrative only and any suitable workpiece or blank could be externally broached with helical splines by means of applicant's invention.

Figure 2:
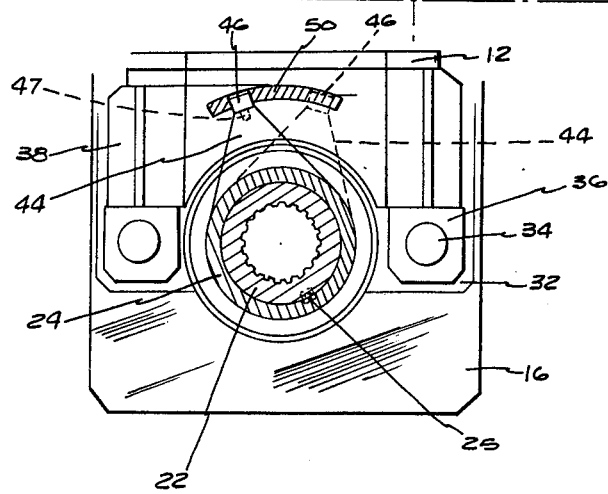
FIG. 2 is a partial sectional view taken substantially on line 2—2 of FIG. 1.

The pot-type broaching assembly, generally indicated at 23, comprises the broaching tool 22 fixably mounted in the inverted housing or pot 24 against rotation by means such as key 25 (FIG. 2). The housing 24 is in turn rotatably secured to the pusher member 30 of ram 14 against the lower race portion of thrust bearing 28 by annular flanged ring member 27 having means, such as bolts 26, for positioning on the lower end of pusher member 30. Suitable radial bearing means, such as a tubular bushing member indicated at 29, is provided to receive the radial thrust of the rotatable housing 24 while allowing for accurate rotation of the broaching assembly 23 about its vertical axis. It should be noted that any bearing arrangement may be used that is well known in the art such as the ball bearing type indicated in FIG. 1. The upper race portion of bearing 28 is fixably secured to the pusher member 30 so as to allow for free rotation of the pot broach assembly 23 relative to the ram.

Slides 32, extending from pusher member 30, are carried on the guide posts 34 extending from plate 16. The posts 34 are secured at their upper ends by brackets 36 suitably mounted to the column portion 12 of the machine by horizontal structural plate 38.

An annular ring 40 is secured to the underside of the broach housing 23 by suitable means such as machine screws 42 and has an integral radial cam arm 44 (FIG. 2) extending toward the machine column 12. The ring 40 has an internal diameter providing opening 41 concentric with and greater than the workpiece diameter to allow movement of the broaching tool into engagement with the collar portion 20 of the workpiece W. In this way the ring 40 axially positions the broaching tool relatively thereto the housing 24 so that the cutting teeth of the broaching tool are accurately located for each broaching operation.

A cam follower 46 is rotatable on the outer extremity of arm 44 by suitable means such as by a radial pin and bearing socket arrangement, indicated at 47, to allow for ease of movement of follower 46 in a grooved cam track 48 located in a cam plate 50. The arm 44 is defined by outwardly converging edges tangent to the ring 40 to allow the arm 44 to positively rotate the broach housing 24 with substantially no lost motion.

It will be seen in FIG. 2 that cam plate 50 is vertically supported on machine column 12 such as by welding or the like. Vertical cam plate 50 has an arcuate configuration in horizontal cross section such that its center of curvature coincides with the vertical axis 52 of the machine, FIG. 1.

As seen in FIG. 1 the cam track 48 comprises an upper vertical portion 48a, an intermediate curved portion 48b and a lower vertical portion 48c. Both the upper and lower portions 48a and 48b are parallel to the vertical machine axis 52 while the curved portion 48b extends therebetween and positively rotates the pot broaching assembly 23 during the broaching stroke.

The complete work cycle of the broaching apparatus commences as the pot broaching assembly 23 is vertically moved by the ram in a downward stroke from the illustrated position guided by cam track portion 48a whereby no relative rotation occurs and the lowermost teeth of the broaching tool are positioned in cutting relation to ring 20. At this time the follower 46 moves downward into the curved cam track portion 48b simultaneously with the commencement of the helical cutting operation in connection with the surface of ring 20 of the workpiece. As the ram member descends in a cutting stroke the cutting edges of the broaching tool come into engagement with the ring portion 20. During the movement of the broach over the workpiece, the broach is positively rotated by the movement of the cam follower 46 in the curved cam track portion 48b to the position indicated by the dashed lines of arm 44 in FIG. 2.

At this time the cutting operation has been completed and the cam track portion 48c guides the pot broach assembly, indicated by trace lines 22 of the broaching tool, to its lowermost position. In such a position the workpiece W will be partially located in the hollow core 62 of pusher member 30 so as to extend into the chamber of tubular casing 64 which connects ram 14 with pusher member 30. The casing 64 has an opening 66 which allows the operator to remove the workpiece therethrough after being lifted vertically so as to clear the work support post 18 and fixture.

It will be apparent that the illustrative embodiment of the invention described above is susceptible to various modifications within the purview of the invention. Accordingly, the invention is not limited to the embodiment shown and described but is to the scope defined in the appended claims.

I claim:

1. In a broaching apparatus for non-linearly broaching a workpiece, a frame, a work support removably supporting said workpiece in a stationary position relatively to said frame, a ram member supported by said frame for reciprocating movement along a predetermined linear axis, a broaching tool mounted on said ram member for reciprocation thereby past said workpiece, said broaching tool being mounted on said ram member freely rotatable about said axis, and cam and lever means for imparting rotational movement to said broaching tool about said axis during at least a portion of its reciprocating movement past said workpiece and for maintaining said tool in a predetermined angular position about said axis before and after said reciprocating movement past said workpiece, said cam and lever means comprising an arm member substantially radially projecting from said broaching tool, a cam track dependent from said frame and means on the end of said arm continuously engaged in said cam track.

2. The combination of claim 1 wherein said last mentioned means is a roller cam follower mounted on the end of said arm member.

3. The combination of claim 1 wherein said broaching tool is a pot broach rotatably mounted in a housing affixed to said ram member, and said ram member is affixed to said pot broach.

4. The combination of claim 1 wherein said cam track is formed generally as a slot in a plate member extending parallel to said axis, said plate member having an arcuate configuration in a plane normal to said axis and the center of the curvature thereof is concentric with said axis.

5. In a broaching apparatus for broaching a workpiece by non-linearly removing material from a surface thereof, an elongated frame, a work support removably supporting said workpiece in a stationary position relatively to said frame, a ram member supported by said frame for reciprocating movement along a predetermined linear axis, a broaching tool mounted on an end of said ram member for reciprocation thereby past said workpiece, means disposed between said end of the ram member and said broaching tool for enabling said broaching tool to freely rotate about said axis, an arm member radially extending from said broaching tool, a plate member dependent from said frame and extending generally parallel to said axis, a cam slot formed in said plate member and having at least a portion inclined relatively to said axis, and a cam follower on the end of said arm engaging said cam slot for rotating said broaching tool about said axis during translation past said workpiece according to the path of said cam track.

6. The combination of claim 5 wherein said broaching tool is an annular pot broach for removing material from the periphery of said workpiece.

7. The combination of claim 5 wherein said plate member is arcuate in a plane normal to said axis and the center of curvature thereof is concentric with said axis.

References Cited

UNITED STATES PATENTS

| | | | |
|---|---|---|---|
| 2,522,712 | 9/1950 | Gotberg | 90—10 |
| 2,644,369 | 7/1953 | Praeg | 90—10 |
| 2,674,924 | 4/1954 | Nielsen | 90—10 |
| 3,288,699 | 11/1966 | Trager et al. | 90—10 |

ANDREW R. JUHASZ, Primary Examiner

G. WEIDENFELD, Assistant Examiner

U.S. Cl. X.R.

90—91, 95